United States Patent [19]

Kawasoe et al.

[11] Patent Number: 5,036,728
[45] Date of Patent: Aug. 6, 1991

[54] ENGINE CONTROL SYSTEM FOR VEHICLE WITH AUTOMATIC TRANSMISSION

[75] Inventors: Satoru Kawasoe; Mitsutoshi Abe; Koichi Yamamoto, all of Hiroshima, Japan

[73] Assignee: Mazda Motor Corporation, Hiroshima, Japan

[21] Appl. No.: 102,851

[22] Filed: Sep. 30, 1987

[30] Foreign Application Priority Data

Oct. 2, 1986 [JP] Japan .................. 61-235931
Oct. 20, 1986 [JP] Japan .................. 61-250392

[51] Int. Cl.$^5$ ........................................... B60K 41/06
[52] U.S. Cl. ................................................... 74/858
[58] Field of Search ............... 74/851, 852, 858, 860, 74/872

[56] References Cited

U.S. PATENT DOCUMENTS

| | | | |
|---|---|---|---|
| 3,349,878 | 10/1967 | De Castelet | 74/858 X |
| 4,266,447 | 5/1981 | Heess et al. | 74/852 X |
| 4,355,550 | 10/1982 | Will et al. | 74/858 X |
| 4,370,903 | 2/1983 | Stroh et al. | 74/851 X |
| 4,403,527 | 9/1983 | Mohl et al. | 74/851 X |
| 4,640,394 | 2/1987 | Higashi et al. | 192/3.29 |
| 4,677,880 | 7/1987 | Hattori et al. | 74/858 X |
| 4,709,595 | 12/1987 | Hayami | 74/858 X |
| 4,718,014 | 1/1988 | Kobayashi et al. | 74/852 X |
| 4,726,798 | 2/1988 | Davis | 74/851 X |
| 4,770,064 | 9/1988 | Kuerschner | 74/858 |
| 4,788,890 | 12/1988 | Anderson | 74/851 |
| 4,800,781 | 1/1989 | Yasue et al. | 74/851 |

FOREIGN PATENT DOCUMENTS 2742809 4/1979 Fed. Rep. of Germany ........ 74/851
5696129 8/1981 Japan .

*Primary Examiner*—Dwight Diehl
*Attorney, Agent, or Firm*—Sixbey, Friedman, Leedom & Ferguson

[57] ABSTRACT

An engine control system for a vehicle having an automatic transmission in which the gear-shifting is automatically done on the basis of a predetermined shift pattern comprises an engine output control system for controlling the output power of the engine, a detecting system which detects actual shifting action of the gear train mechanism of the automatic transmission, and an engine control unit which receives a signal from the detecting system and delivers to the engine output control system a control signal for temporarily lowering the engine output power while the actual shifting action of the gear mechanism is in progress.

8 Claims, 6 Drawing Sheets

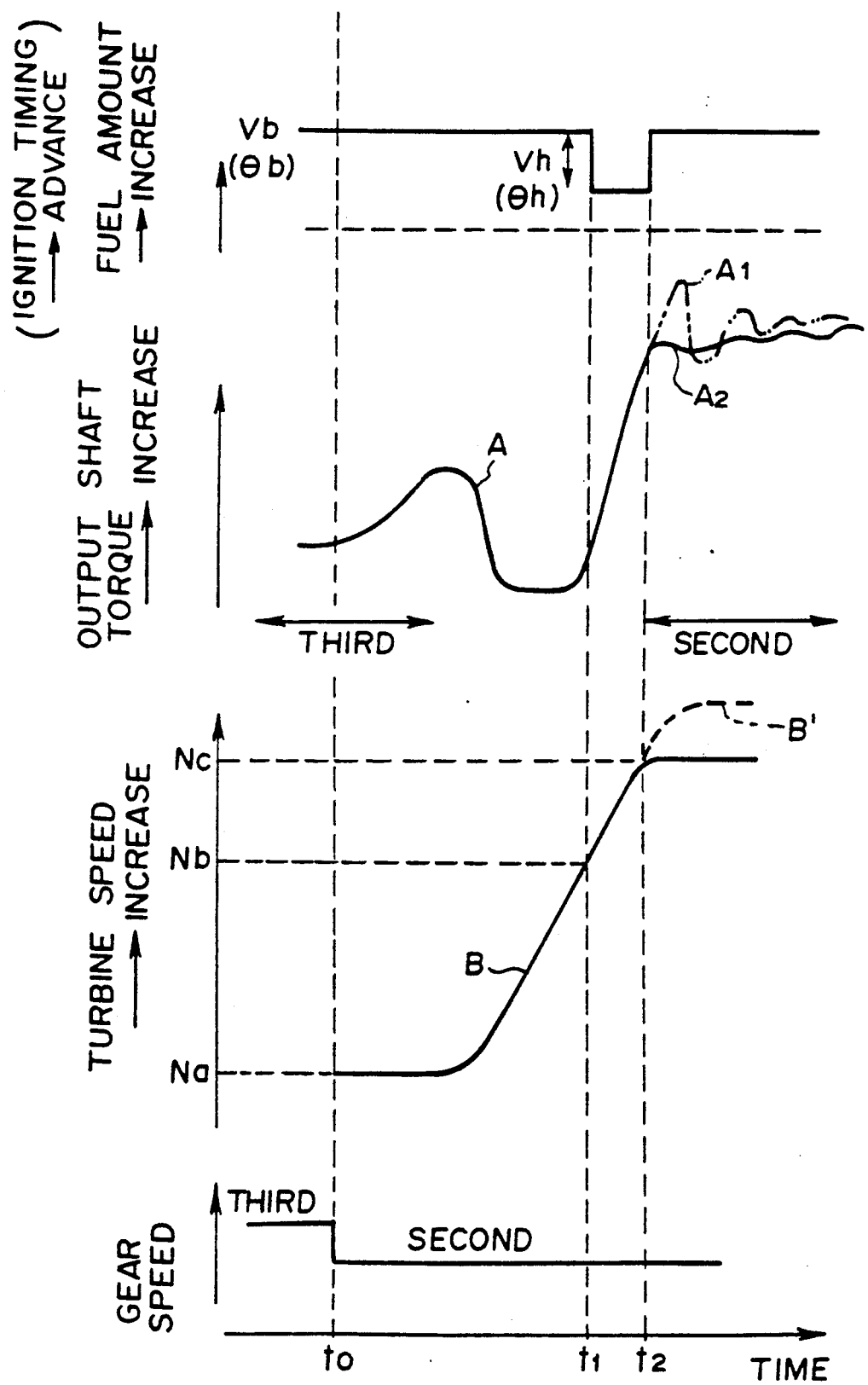

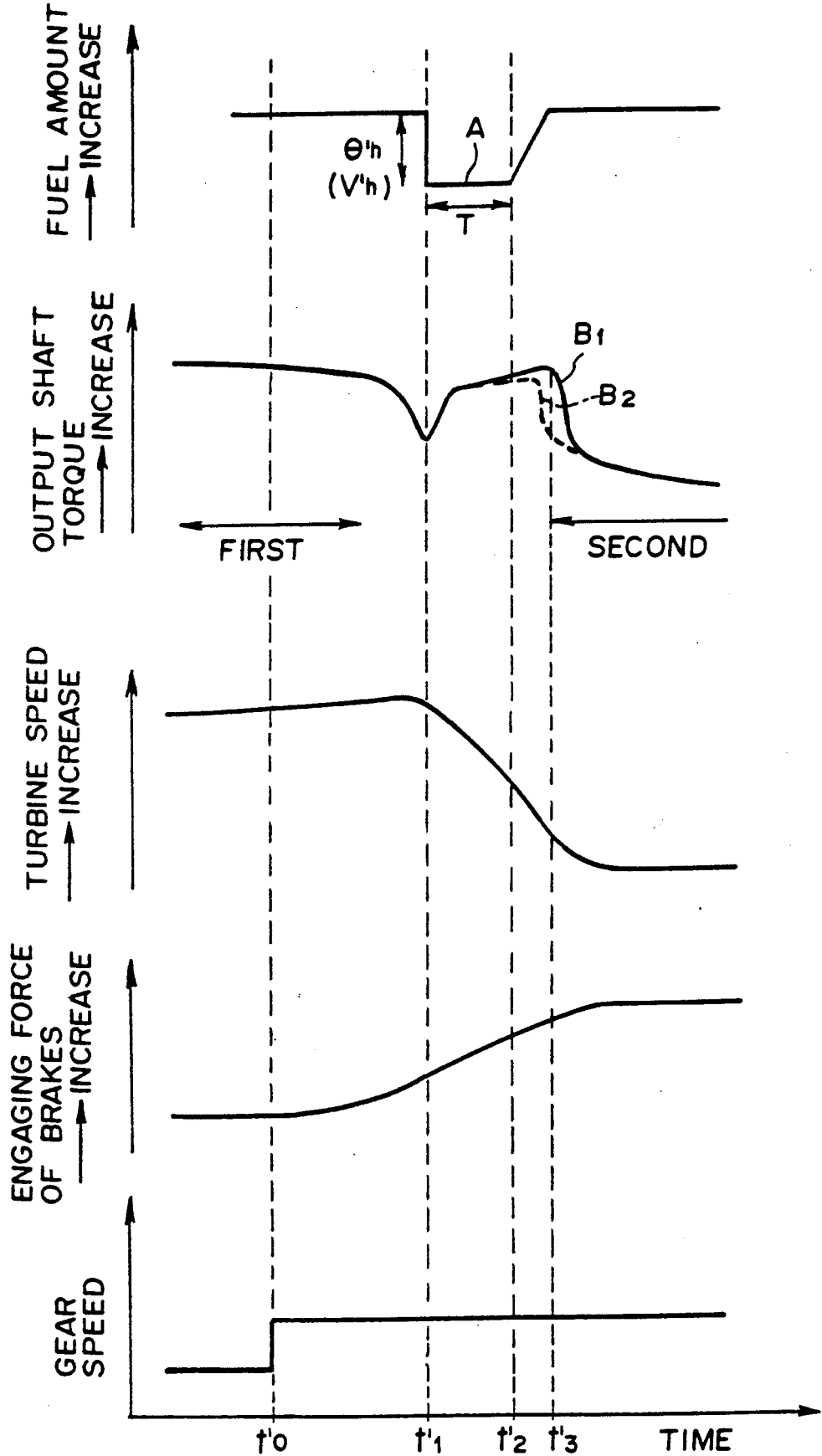

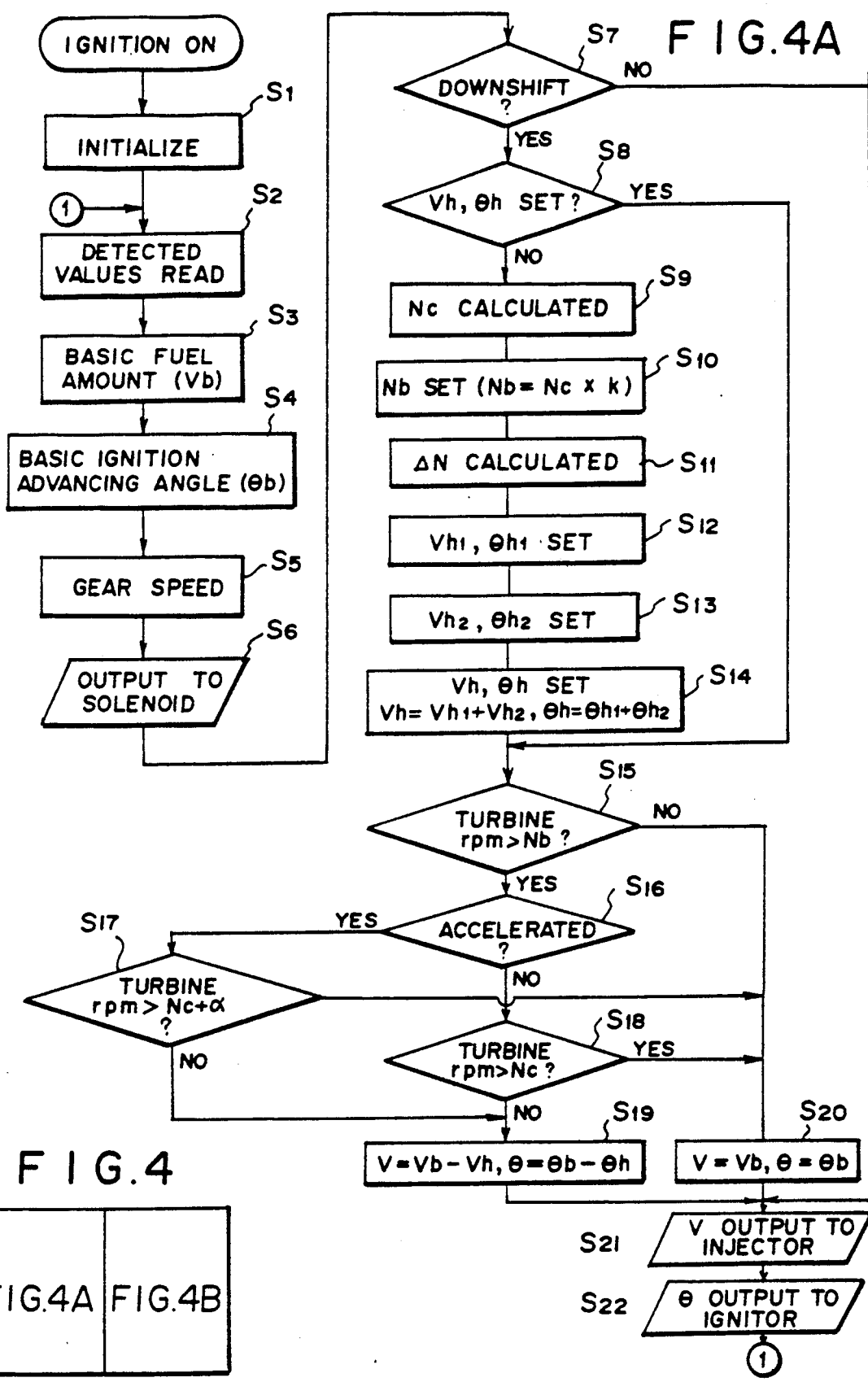

ENGINE CONTROL SYSTEM FOR VEHICLE WITH AUTOMATIC TRANSMISSION

BACKGROUND OF THE INVENTION

1. Field of the Invention

This invention relates to an engine control system for a vehicle with an automatic transmission, and more particularly to an engine control system for a vehicle with an automatic transmission which prevents torque shock arising in the gear-shifting process.

2. Description of the Prior Art

In an automatic transmission, generally gear-shifting is done automatically according to the motional state of the vehicle on the basis of a predetermined shift pattern. That is, a shift pattern in which gear speeds are set according to vehicle speed and engine load (throttle opening) is stored in a control section and the automatic transmission is controlled on the basis of the shift pattern.

As a system for controlling an engine in a vehicle with such an automatic transmission in order to prevent torque shock arising in the gear-shifting process, there has been known a fuel supply system such as that disclosed in Japanese Unexamined Patent Publication No. 56(1981)-96129. In consideration of the fact that the torque of the output shaft of the automatic transmission is temporarily increased after an upshift signal is generated to upshift, for instance, from first to second or from second to third, the fuel supply system reduces the amount of fuel to be supplied to the combustion chambers (or fuel pressure) and lowers the engine output power, thereby restraining the torque increase.

However, in some cases, the fuel supply system cannot effectively prevent the shift shock. That is, detailed inspection of torque fluctuation during upshifting reveals that when the upshift signal is generated and the shifting action actually takes place in the transmission, the output shaft torque first lowers due to an increase in frictional resistance and the like before the transmission is released from the preceding state, and then increases. (See line B1 in FIG. 3.) Accordingly, if the fuel supply is simply reduced in response to an upshift, the engine output power can be lowered at a time other than the time the output shaft torque is apt to increase, e.g., at the time the output shaft torque is lowered, producing an untimely lowering of the output shaft torque, thereby causing a shift shock.

Though it is proposed, in the Japanese unexamined patent publication referred to above, to retard the timing of the lowering of the fuel pressure, taking into account the delay of the action of the transmission when upshifting into third, the timing of the lowering of the fuel pressure can deviate from the timing of the increase in output shaft torque due to error in the setting of the time intervals at which the fuel pressure is lowered. Further, the retardation is not effected when upshifting into second. Thus, this approach cannot satisfactorily overcome the problem described above.

On the other hand, shift shock can be generated also in downshifting, for instance, as a result of a torque peak produced near the completion of the shifting action of the automatic transmission. That is, the shifting action begins to take place a certain time-lag after a downshift signal is generated, and the output shaft torque of the automatic transmission fluctuates in response to the shifting action. Since the torque value after the downshift is higher than that before the downshift, the output shaft torque increases relatively quickly as the shifting action progresses. However, near the completion of the shifting action, the output shaft torque can excessively increase to produce a peak torque before the output shaft torque converges on the torque value after the downshift. When the peak torque is high, a shock is generated. This problem may be overcome by lowering the engine output power in synchronization with the gear-shifting signal. However, this approach is disadvantageous in that acceleration performance immediately after a downshift is lowered, for instance, in the case of a downshift for acceleration purposes.

In our U.S. patent application Ser. No. 808,172 filed on Dec. 12, 1985, there is disclosed an automatic transmission control system in which completion of gear-shifting is detected on the basis of both the rate of change in rotational speed of the output shaft of the torque converter and the rotational speed at which the output shaft of the torque converter is expected to rotate. However, in this system, it is not detected that the actual shifting action of the gear mechanism is in progress.

SUMMARY OF THE INVENTION

In view of the foregoing observations and description, the primary object of the present invention is to provide an engine control system for a vehicle with an automatic transmission which prevents generation of a shock accompanying gear-shifting.

In accordance with the present invention, there is provided an engine control system for a vehicle having an automatic transmission in which the gear-shifting is done automatically on the basis of a predetermined shift pattern, comprising an engine output control means for controlling the output power of the engine, a detecting means which detects the actual shifting action of the gear mechanism of the automatic transmission, and an engine control means which receives a signal from the detecting means and delivers to the engine output control means a control signal for temporarily lowering the engine output power while the actual shifting action of the gear mechanism is in progress.

BRIEF DESCRIPTION OF THE DRAWINGS

FIG. 2 is a time chart for illustrating the operation of the control unit during downshifting, FIG. 3 is a time chart for illustrating the operation of the unit during upshifting, FIG. 4 shows the relation of FIGS. 4A and 4B.

FIGS. 4A and 4B are flow charts for illustrating a concrete example of the control to be made by the control unit.

DESCRIPTION OF THE PREFERRED EMBODIMENT

Figure 1:
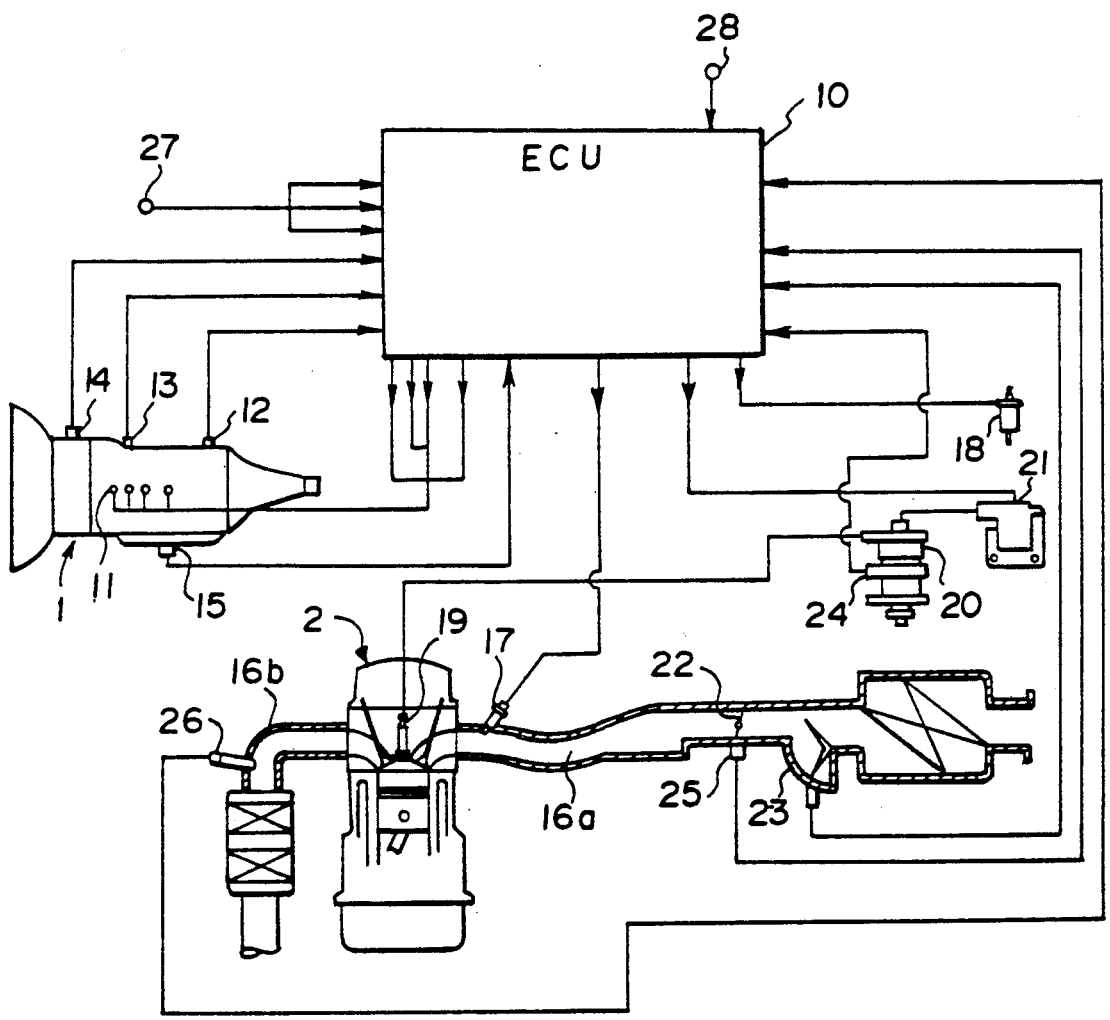
FIG. 1 is a schematic view showing an embodiment of the present invention.

In FIG. 1, reference numeral 10 denotes a control unit (ECU) which controls an automatic transmission 1 and an engine 2. The automatic transmission 1 comprises a torque convertor, a gear mechanism and a hydraulic system for driving the torque convertor and the gear mechanism. The gear shifting is effected by control of a plurality of solenoid valves 11 in the hydraulic system by the control unit 10. The gear mechanism is of a well known structure and comprises gear elements combined with planetary gears and frictional elements such as brakes, clutches, one-way clutches and the like. The automatic transmission 1 is provided with a vehicle speed sensor 12 which detects the vehicle speed by way of the rpm of the output shaft of the automatic transmission 1, an inhibitor switch 13 which detects that the selector lever is in parking or neutral, a turbine speed sensor 14 which detects the turbine speed of the torque convertor and an oil temperature sensor 15 which detects the oil temperature of the hydraulic system. Signals from these sensors and switches are input into the control unit 10.

The engine 2 has intake and exhaust passages 16a and 16b, a fuel system comprising fuel injection valves 17 and a fuel pump 18, and an ignition system comprising spark plugs 19, a distributor 20 and an ignitor 21. A throttle valve 22 is provided in the intake passage 16a. Signals from an airflow meter 23 for detecting the amount of intake air, a crank angle sensor 24 mounted on the distributor 20, a throttle opening sensor 25 for detecting the opening of the throttle valve 22 and an $O_2$ sensor 26 provided in the exhaust passage 16b are input into the control unit 10.

Further, also into the control unit 10 are input signals representing the selected range of the automatic transmission 1 (1, 2 or D), a signal from the ignition switch, and the like.

The control unit 10 stores a shift pattern in which the gear speeds are related to the vehicle speed and the throttle opening, and delivers a signal to the solenoid valves 11 to control the automatic transmission 1 on the basis of the shift pattern, and delivers signals to the fuel injection valves 17, the fuel pump 18 and the ignitor 21 to control the fuel system, the ignition system and the like of the engine 2. The automatic transmission 1 and the engine 2 may be controlled by separate control units. In such a case, the control units should be in communication with each other.

The operation of the control unit 10 will be briefly described hereinbelow with reference to FIGS. 2 and 3.

When the throttle opening changes during acceleration or the vehicle speed changes during deceleration, and the gear speed determined on the basis of the shift pattern changes to a lower gear speed, a downshift signal is delivered to the solenoid valves 11 at the time $t_0$ and the transmission gear mechanism begins to perform the shifting action with a certain time lag while the output shaft torque of the automatic transmission fluctuates as shown by line A in FIG. 2 and the turbine speed varies as shown by line B. That is, the output shaft torque of the automatic transmission is temporarily lowered due to the resistance of the rotating bodies when the transmission gear mechanism actually begins to perform the shifting action, and is quickly increased as the shifting action progresses, and is apt to be temporarily excessively increased to produce a peak torque (shown by line $A_1$) before converging on the value after the downshift as the shifting action comes to an end. The turbine speed increases according to change in the gear ratio from the time when the transmission gear mechanism begins to perform the shifting action and is stabilized upon completion of the shifting action. Since the harder the change in the turbine speed is, the harder the torque fluctuation is, the peak torque becomes higher as the change in the turbine speed becomes harder.

By detecting that the turbine speed reaches a reference speed Nb somewhat lower than an expected turbine speed Nc on which the turbine speed is expected to converge, the period $t_1$ the output shaft torque is increasing after the transmission gear mechanism actually begins to make the shifting action is detected, and from the time the period $t_1$ is detected, the control unit 10 lowers the engine output power. In this particular embodiment, the control unit 10 lowers the engine output power both by reducing the fuel injection amount and by retarding the ignition timing. The amount by which the fuel injection amount is reduced Vh (fuel injection amount correction) and the crank angle by which the ignition timing is retarded $\theta h$ (ignition timing correction) are preferably determined according to the turbine speed increasing rate, the gear speed after the downshift, the oil pressure, the throttle opening and other factors related to the torque fluctuation. This control is terminated at the time $t_2$ the turbine speed reaches the expected turbine speed Nc, or may be otherwise terminated when the turbine speed is stabilized after once increasing taking into account the fact that the turbine speed is increased above the expected turbine speed Nc in the case of a downshift for acceleration purposes.

When the gear speed determined on the basis of the shift pattern changes to a higher gear speed, an upshift signal is delivered to the solenoid valves 11 at the time $t'_0$ and the transmission gear mechanism begins to perform the shifting action while the output shaft torque fluctuates as shown by line $B'1$ in FIG. 3. For example, while the gear speed is being shifted up from first to second, the output shaft torque is lowered once owing to the increase in frictional resistance before release of the one-way clutch which has held the transmission gear mechanism in first speed, and after the release of the one-way clutch, the transmission gear mechanism actually begins to upshift to second at the time $t'_1$, and from the time $t'_1$, the output shaft torque begins to increase from inertia and the like. After the time $t'_3$ the second brake is applied and the transmission gear mechanism is locked in second speed, the output shaft torque is somewhat lowered and then stabilized. The turbine speed is gradually reduced to converge on the value in second speed from the time $t'_1$. Also in upshifting to another gear speed, a similar inclination appears.

When the time $t'_1$ the transmission gear mechanism actually begins to upshift to a higher gear speed is detected, the control unit 10 lowers the engine output power. Similarly to the case of downshifting, the control unit 10 lowers the engine output power both by reducing the fuel injection amount and by retarding the ignition timing. That is, the reduction of the fuel injection amount $V'_h$ and the retardation of the ignition timing $\theta'h$ are selected to substantially cancel the increase of the output shaft torque, and are maintained until a predetermined time T elapses from the time $t'_1$ as shown by line A in FIG. 3. Thereafter, the fuel injection amount and the ignition timing are returned to the basic values when the upshift is completed. Since the increase of the output shaft torque and the time required for the transmission gear mechanism to complete the upshift depend on the gear speed to which the transmission is to be shifted up to, the pressure of the hydraulic oil which depends upon the throttle opening, and the viscosity of the hydraulic oil which depends upon the oil temperature or the coolant temperature, the time T, the fuel injection amount correction, the ignition timing correction, and the rates at which the fuel injection amount and the ignition timing are to be returned to the basic value are set according to these factors.

Figure 4B:
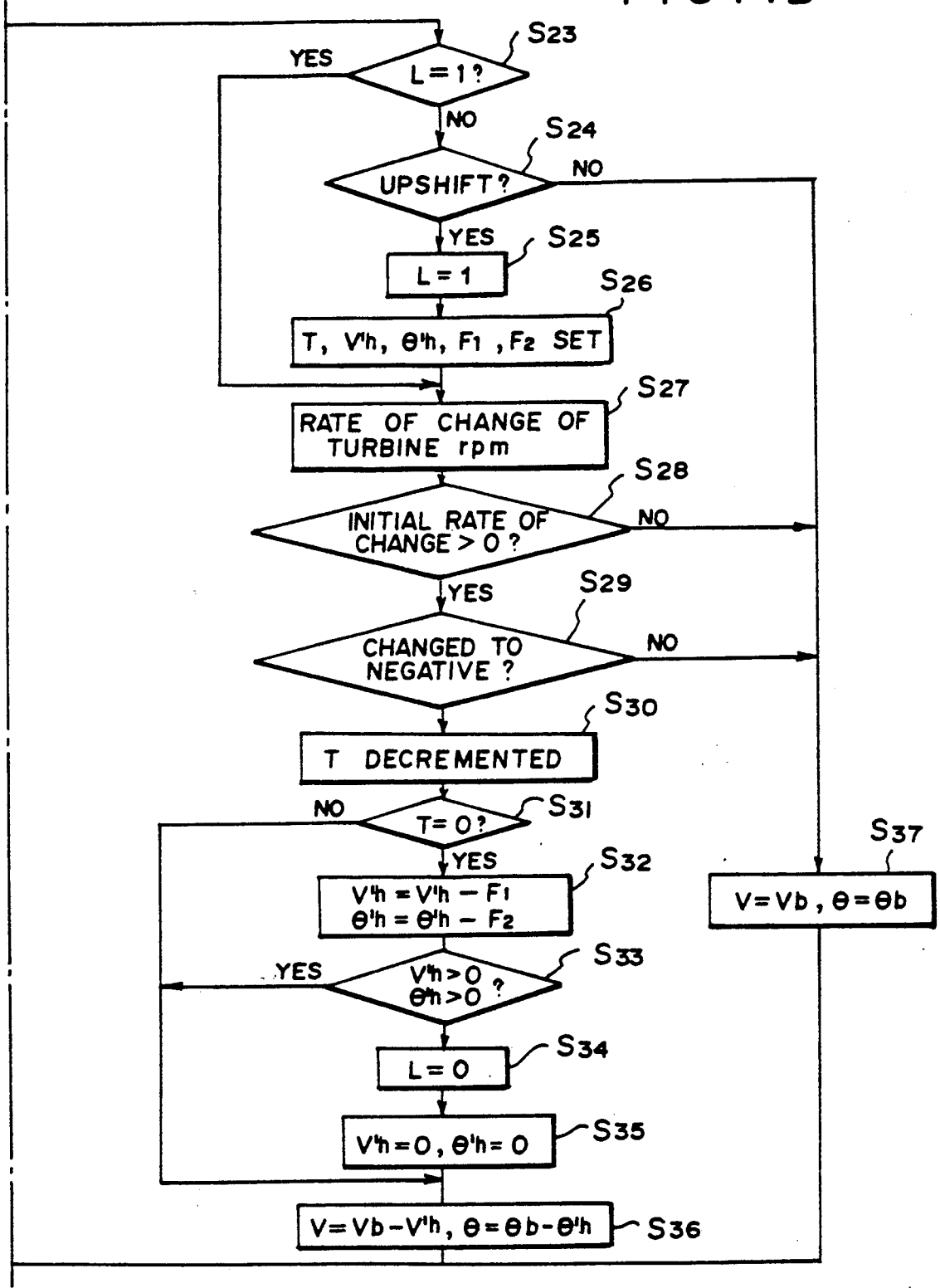

FIG. 4 is a flow chart illustrating a concrete example of the control by the control unit 10.

Figure 5:
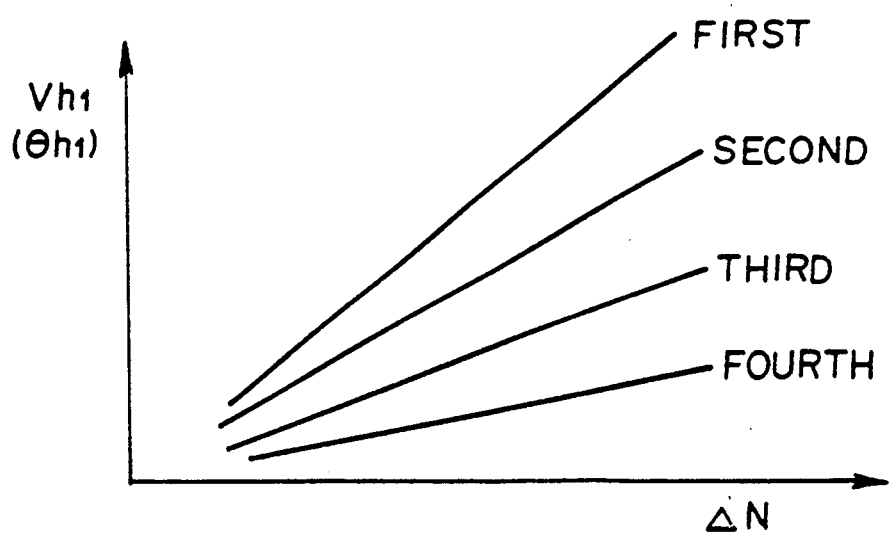
FIGS. 5 and 6 are examples of the maps on the basis of which the fuel injection amount correction and the ignition timing correction are determined.
Figure 6:
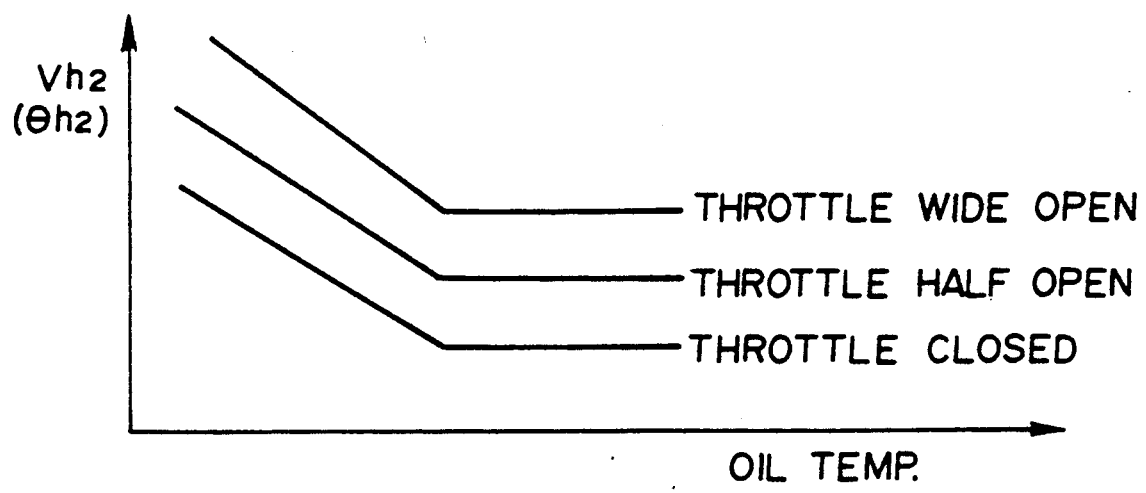

The process shown by the flow chart of FIG. 4 is started when the ignition switch is turned on. Step S1 is an initialization step. In step S2, information from the sensors and switches are read, and in step S3, a basic fuel injection amount Vb is calculated on the basis of the amount of intake air, the engine speed and the like. In step S4, a basic ignition timing advancing angle θb by which the ignition timing is advanced is calculated on the basis of the amount of intake air, the engine speed and the like. In step S5, the gear speed is determined according to the vehicle speed and the throttle opening. Then, in step S6, a control signal according to the determined gear speed is delivered to the solenoid valves 11 of the automatic transmission 1. In step S7, it is determined whether the control signal delivered to the solenoid valves 11 is a downshifting signal. When it is determined in the step S7 that the control signal is a downshifting signal, it is determined in step S8 whether correction amounts have been set. When it is determined in the step S8 that the correction amounts have not been set yet, an expected turbine speed Nc on which the turbine speed is expected to converge is calculated according to the turbine speed before increase Na and the gear ratio in step S9. Then, in step S10, a reference turbine speed Nb (FIG. 2) is set by multiplying the expected turbine speed Nc by a coefficient K, and in step S11, the turbine speed increasing rate ΔN is calculated. A fuel injection amount correction Vh1 and an ignition timing correction θh1 according to the turbine speed increasing rate ΔN and the gear speed are set in step S12 on the basis of the map shown in FIG. 5. In step S13, a fuel injection amount correction Vh2 and an ignition timing correction θh2 according to the oil temperature and the throttle opening are set on the basis of the map shown in FIG. 6. Then in step S14, the fuel injection amount correction Vh1 according to the turbine speed increasing rate ΔN and the gear speed and the fuel injection amount correction Vh2 according to the oil temperature and the throttle opening are added together to obtain a final fuel injection amount correction Vh, and the ignition timing correction θh1 according to the turbine speed increasing rate ΔN and the gear speed and the ignition timing correction θh2 according to the oil temperature and the throttle opening are added together to obtain a final ignition timing correction θh. It is determined in step S15 whether the turbine speed has reached the reference turbine speed Nb. When it is determined in step S8 that the correction amounts have been already set, the control unit 10 directly proceeds from step S8 to step S15. When it is determined in step S15 that the turbine speed has not yet reached the reference turbine rpm Nb, the basic fuel injection amount Vb is output to the fuel injector as a final fuel injection amount V as it is, and the basic ignition timing advancing angle θb is output to the ignitor as a final ignition timing advancing angle θ as it is. (steps S20 to S22) That is, until the turbine speed reaches the reference turbine speed Nb, no correction is made to either the fuel injection amount or the ignition timing advancing angle. When it is determined in step S15 that the turbine speed has reached the reference turbine speed Nb, it is determined in the next step S16 whether the vehicle is being accelerated. When it is determined in the step S16 that the vehicle is not being accelerated, and at the same time, it is determined in step S18 that the turbine speed has reached the expected turbine speed Nc, the basic fuel injection amount Vb is output to the fuel injector as a final fuel injection amount V as it is, and the basic ignition timing advancing angle θb is output to the ignitor as a final ignition timing advancing angle θ as it is. (steps S20 to S22) On the other hand, when it is determined in step S18 that the turbine speed has not reached the expected turbine speed Nc, the value obtained by subtracting the final fuel injection amount correction Vh from the basic fuel injection amount Vb is output to the fuel injector as the final fuel injection amount V and the value obtained by subtracting the final ignition timing correction θh from the basic ignition timing advancing angle θb is output to the ignitor as the final ignition timing advancing angle θ. (steps S19, S21 and S22) On the other hand, when it is determined in step S16 that the vehicle is being accelerated, the value obtained by subtracting the final fuel injection amount correction Vh from the basic fuel injection amount Vb is output to the fuel injector as the final fuel injection amount V and the value obtained by subtracting the final ignition timing correction θh from the basic ignition timing advancing angle θb is output to the ignitor as the final ignition timing advancing angle θ until the turbine speed reaches Nc+α (steps S17, S19, S21 and S22), and the basic fuel injection amount Vb is output to the fuel injector as a final fuel injection amount V as it is and the basic ignition timing advancing angle θb is output to the ignitor as a final ignition timing advancing angle θ as it is after the turbine speed reaches Nc+α (steps S17 and S20 to S22).

When it is determined in step S7 that the control signal is not a downshifting signal, it is determined in step S23 whether the flag L for an upshift control decision is 1. When it is determined in step S23 that the flag L is not 1 and it is determined in step S24 that the control signal is not an upshifting signal, the basic fuel injection amount Vb is output to the fuel injector as a final fuel injection amount V as it is and the basic ignition timing advancing angle θb is output to the ignitor as a final ignition timing advancing angle θ as it is (step S37). When it is determined in step S23 that the flag L is not 1 and it is determined in step S24 that the control signal is an upshifting signal, the flag F is set at 1 in step S25 and then timer T for setting the time interval for which the correction is to be maintained, fuel injection amount correction V'h, ignition timing correction θ'h, and values F1 and F2 for respectively determining the return rates of the fuel injection amount and the ignition timing are determined according to the gear speed which the transmission is shifted up to, the throttle opening and the oil temperature (or the coolant temperature) in step S26. The fuel injection amount correction V'h and the ignition timing correction θ'h may be predetermined constants or may be obtained through a calculation similar to that described above in conjunction with steps S11 to S14. Thereafter, the control unit 10 proceeds to step S27. When it is determined in step S23 that the flag L is 1, the control unit 10 directly proceeds to step S27. In step S27, the change of the turbine speed is calculated on the basis of the difference between the turbine speed at that time and the turbine speed at the preceding flow. In the next step S28, it is determined whether the rate of change of the turbine speed was initially positive. When it is determined in the step S28 that the rate of change of the turbine speed was initially positive, it is determined in step S29 whether the rate of change of the turbine speed has changed to negative. Whether it is determined in step S28 that the rate of change of the turbine speed was not initially positive or it is determined in step S29 that the rate of change of the turbine speed has not changed to negative, the basic fuel injection amount Vb is output to the fuel injector as a final fuel injection amount V as it is and the basic ignition timing advancing angle θb is output to the ignitor as a final ignition timing advancing angle θ as it is (step S37). On the other hand, when it is determined in step S29 that the rate of change of the turbine speed has changed to negative, the time T is decremented in step S30. Until the timer T is decremented to zero, the value obtained by subtracting the fuel injection amount correction V'h from the basic fuel injection amount Vb is output to the fuel injector as the final fuel injection amount V and the value obtained by subtracting the ignition timing correction θ'h from the basic ignition timing advancing angle θb is output to the ignitor as the final ignition timing advancing angle θ. (steps S31 and S36) After the timer T is decremented to zero, the fuel injection amount correction V'h is gradually reduced by the value F1 at one time and the ignition timing correction θ'h is gradually reduced by the value F2 at one time until the corrections V'h - F1 and θ'h - F2 becomes smaller than zero. Thus, the fuel injection amount V and the ignition timing θ are gradually returned to the basic values. (steps S31, S32, S33 and S36) When the corrections V'h - F1 and θ'h - F2 become smaller than zero, the flag L is set at zero in step S34, and the corrections V'h and θ'h are set at zero in step S35. Thus, the fuel injection amount V and the ignition timing θ are returned to the basic values.

By the control described above, the peak torque produced near the end of the downshifting action or the upshifting action of the transmission mechanism is lowered. That is, after downshifting action of the transmission gear mechanism has progressed to some extent, the output shaft torque of the automatic transmission is generally apt to abruptly increase as shown by line A1 in FIG. 2. However, in accordance with the present invention, the engine output power is lowered by reducing the fuel supply and retarding the ignition timing while the output shaft torque is increasing, whereby the abrupt increase of the output shaft torque is restrained so that the output shaft torque smoothly changes to the torque value after the downshift as shown by line A2 in FIG. 2. Thus the peak torque is lowered and shift shock is restrained.

Further, during upshifting, the engine output power is lowered from the time t'1 (FIG. 3) when the upshifting action actually begins to take place, so excessive increase of the output shaft torque which can cause a shift shock can be restrained without fear of untimely lowering of the engine output power occurring when the output shaft torque is lowered. Further, the peak torque which is apt to be produced immediately before completion of the upshifting action can be lowered as shown by line B'2 in FIG. 3. Line B'1 in FIG. 3 shows the output shaft torque fluctuation when no correction is made to the engine output power. Further, by restraining the peak torque, the time required for the upshift is shortened, wear of the frictional elements is reduced and the reliability of the transmission gear mechanism can be improved.

Though in the embodiment described above the engine output power is controlled by controlling both the fuel injection amount and the ignition timing, the engine output power may be controlled by controlling one, either the fuel injection amount or the ignition timing, and may be controlled by controlling other factors such as exhaust gas recirculation. Further, although in the embodiment described above the time the shifting action begins to take place in the transmission gear mechanism during upshifting is detected by way of the turbine speed, the time may be detected by a sensor which directly detects motion of a gear or the like in the transmission gear mechanism. The system in accordance with the embodiment described above in which the engine output power is lowered when the actual beginning of the upshifting action is detected by way of the turbine speed is advantageous over the conventional system in which the engine output power is lowered a predetermined amount after generation of an upshifting signal in that, in the former system, correction according to external conditions such as the gear speed which the transmission is to be shifted up to, the engine load, and the oil temperature is not essential, unlike in the latter system.

We claim:

1. An engine control system for a vehicle having an automatic transmission in which gear-shifting is done automatically on a basis of a predetermined shift pattern, comprising an engine output control means for controlling an output power of the engine, a detecting means which detects an actual shifting action of a gear mechanism of the automatic transmission, and an engine control means which receives a signal from the detecting means and delivers to the engine output control means a control signal for temporarily lowering the engine output power while the actual shifting action of the gear mechanism is in progress where the amount by which the engine output power is lowered is a function of at least gear position so that said amount is increased as the gear is lowered.

2. An engine control system as defined in claim 1 in which the amount by which the engine output power is lowered is determined in proportion to the value of the rate of change of the turbine speed.

3. An engine control system for a vehicle having an automatic transmission in which gear-shifting is done automatically on the basis of a predetermined shift pattern, comprising an engine output control means for controlling the output power of an engine, a detecting means which detects an actual shifting action of the gear mechanism of the automatic transmission, and an engine control means which receives a signal from the detecting means and delivers to the engine output control means a control signal for temporarily lowering the engine output power while the actual shifting action of the gear mechanism is in progress where the lowering and returning of the engine output power are effected substantially instantaneously during downshifting, while at least returning of the lowered engine output power is effected gradually during upshifting.

4. An engine control system for a vehicle having an automatic transmission in which gear-shifting is done automatically on the basis of a predetermined shift pattern, comprising an engine output control means for controlling the output power of an engine, a detecting and determining means which detects, in response to downshifting of the automatic transmission, an initial speed Na of the turbine of the automatic transmission and then determines, as a function of Na, (a) an expected speed Nc of the turbine together with (b) a turbine speed Nb less than Nc to generate a first control signal, detecting means for detecting the rate of the turbine speed during upshifting to generate a second control signal, and an engine control means which receives said first and second signals from the detecting means and delivers to the engine output control means a control signal for temporarily lowering the engine output power while the actual shifting action of the gear mechanism is in progress where, during downshifting, the engine output power is lowered based on a comparison of the turbine speed with Nb and Nc while it is lowered based on the rate of change of the turbine speed during upshifting.

5. An engine control system as defined in claim 4 in which the time to return the engine output power to the original power value is delayed when the vehicle is being accelerated.

6. An engine control system for a vehicle having an automatic transmission in which gear-shifting is done automatically on a basis of a predetermined shift pattern, comprising an engine output control means for controlling an output power of the engine, a detecting means which detects an actual shifting action of a gear mechanism of the automatic transmission, and an engine control means which receives a signal from the detecting means and delivers to the engine output control means a control signal for temporarily lowering the engine output power while the actual shifting action of the gear mechanism is in progress where the amount by which the engine output power is lowered is a function of at least a rate of change of the turbine speed so that said amount is increased as the rate of change of the turbine speed is increased.

7. An engine control system for a vehicle having an automatic transmission in which gear-shifting is done automatically on a basis of a predetermined shift pattern, comprising an engine output control means for controlling an output power of the engine, a detecting means which detects an actual shifting action of a gear mechanism of the automatic transmission, and an engine control means which receives a signal from the detecting means and delivers to the engine output control means a control signal for temporarily lowering the engine output power while the actual shifting action of the gear mechanism is in progress where the amount by which the engine output power is lowered is a function of at least temperature which represents warming-up condition of the automatic transmission so that said amount is increased as the temperature is lowered.

8. An engine control system as defined in claim 7 in which said amount is further a function of engine load so that said amount is increased as the engine load is increased.

* * * * *